(No Model.)

T. H. & A. M. RESSLER.
CAKE DISH.

No. 470,827.                              Patented Mar. 15, 1892.

Witnesses
Martin Rettig
Ella L. Gerhart

Inventors
Thaddeus H. Ressler
Annie M. Ressler
pr H. M. R. Gerhard
Atty.

UNITED STATES PATENT OFFICE.

THADDEUS H. RESSLER AND ANNIE M. RESSLER, OF RONKS, PENNSYLVANIA.

CAKE-DISH.

SPECIFICATION forming part of Letters Patent No. 470,827, dated March 15, 1892.

Application filed July 16, 1891. Serial No. 399,769. (No model.)

*To all whom it may concern:*

Be it known that we, THADDEUS H. RESSLER and ANNIE M. RESSLER, citizens of the United States, residing at Ronks, in the county of Lancaster and State of Pennsylvania, have invented certain Improvements in Cake-Dishes, of which the following is a specification.

This invention relates to improvements in that class of culinary vessels used for baking cakes of considerable depth that are cut into vertical slices when served, such as pound-cake, lady-cake, fruit-cake, and the like. The baking-dishes now used must be turned upside down to remove the cake after being baked, and then the cake must be turned back to rest on its bottom. This is necessary, not only to disengage the cake from the portion of the dish surrounding it, but to ice the sides of the same, as is the general practice with cakes of this character, especially for weddings, parties, and other social gatherings. This emptying of the cake tends to break and mar the sides, rendering it difficult to ice the same, and also tears pieces from the bottom, requiring, in many cases, that it be wedged up to maintain an upright position on the plate on which it is placed.

The object of this invention is, first, to provide a rim for the dish which can be removed without disturbing the seat of the cake on the dish, and, second, to so connect the center flue with the bottom of the dish that it also may be detached without moving the cake. The mechanism by which we accomplish this result is illustrated in the accompanying drawings, in which—

Figure 1:
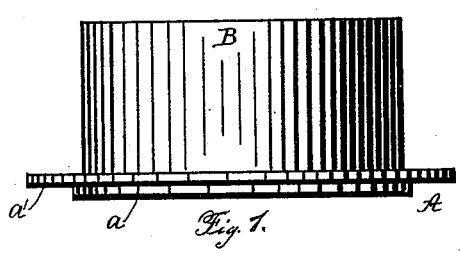
Figure 2:
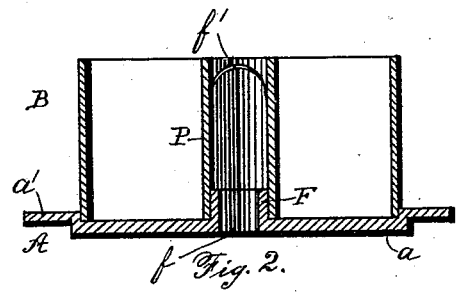
Figure 3:
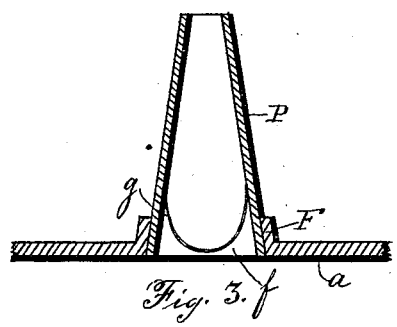
Figure 4:
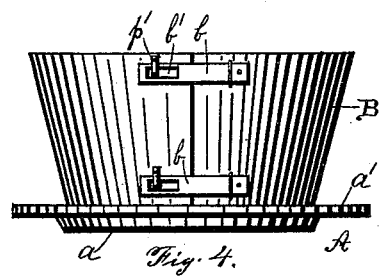

Figure 1 is a side view of one form of our cake-dish. Fig. 2 is a central vertical section through Fig. 1. Fig. 3 is a central vertical section through the flue and a portion of the bottom of the dish, shown in Fig. 4. Fig. 4 is a side view of a modified form of the cake-dish, and Fig. 5 a perspective view of the same.

Similar letters indicate like parts throughout the several views.

Referring to the details of the drawings, A indicates the bottom of the dish and is generally of the same shape as an ordinary pie-dish, consisting of a bowl $a$, having a horizontal flange $a'$ that serves as a hold by which to move the cake-dish about.

Figure 5:
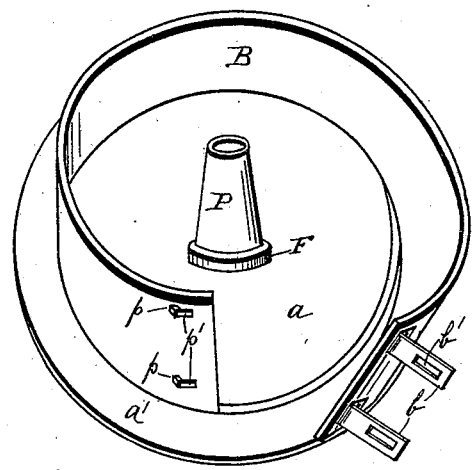

The rim B of the cake-dish is formed of a hollow cylinder, open at both ends and of the same diameter as the inside of the bottom of the bowl $a$, the sides of which may be either vertical, as shown in Figs. 1 and 2, or slope outward and upward from the bottom to the flange, as shown in Figs. 4 and 5. The rim sets loosely on the bottom of the bowl and is prevented from moving laterally by the sides thereof. The rim may be unbroken, as seen in Figs. 1 and 2, or it may be made of some flexible material and cut through vertically on one side, so as to be expansible, as shown in Figs. 4 and 5.

On the rim on one side of the cut there are hinged one or more hasps $b$, having slots $b'$ adapted to take over detents secured to the rim on the other side of the cut. These detents are formed of horizontal revoluble pins $p$, having hand-holds $p'$ projecting from only one side of the free end thereof, which are turned in a horizontal position toward the hasps when the latter are to engage them, and after being so engaged are again turned to lap the outer faces of the hasps. It is preferable that the vertical edges of the rim should not lap but have their butts fit snugly against each other, as shown in Fig. 4. For this reason the means for fastening the movable ends of the hasps should be of such a character as to avoid any movement of the edges of the wall with relation to each other while the hasps are being secured or released.

In the center of the bottom of the cake-dish there is placed the usual flue P for conveying heat to the center of the cake; but instead of permanently securing it to the bottom we detachably connect it therewith. In the drawings we illustrate two forms of the flue P. That shown in Fig. 2 is a vertical hollow cylinder adapted to embrace and fit snugly over a flange F, surrounding the aperture $f$ in the bottom of the dish. This flue has the ends of a loop $f'$ secured to the opposite sides of its interior with the apex extending upward to serve as a hand-hold, by which the flue may be more readily put in place and removed from the dish. This loop also enables the flue to be rotated back and forth as it is being withdrawn from the dish to loosen it from the cake. The flue shown in Figs. 3 and 5 is the usual frustum of a cone. This flue is inserted by pushing it up from the bottom through the aperture $f$, the sides of which, with the inner face of the flange F, are tapered to correspond with the shape of the conical flue. It is not absolutely necessary that the flange F be used with this form of flue; but it is preferable, as affording a greater bearing-surface. This flue is also provided with a loop, as shown at $g$; but in this case the apex extends downward.

In using the cake-dish, the rim B and flue P being in place, the inner surfaces are properly greased, as is usual, and the dough put into the dish, the contact of the lower edge of the rim B with the sides of the bowl $a$ preventing any escape of dough beneath the rim, should not the weight thereof be sufficient for that purpose. After the cake is baked the rim and flue are removed, leaving the cake exposed on all sides.

In the forms of dish shown in Figs. 1 and 2 both the rim and flue are removed by simply raising them straight up from the bottom A. In the form shown in Figs. 3, 4, and 5 the flue is drawn out by pulling it downward, while the rim is removed by opening the hasps $b$ and then unwinding the said rim from the cake, as shown in Fig. 5.

In Figs. 1 and 2 the rim of the bowl $a$ is shown as being vertical; but where said rim is to be opened the sides of the bowl are sloped, as shown in Figs. 4 and 5, to permit the rim to be opened without injuring the side of the cake. The latter form of rim is the only one which can be used with dishes in which a cake is to be baked having the shape of an inverted frustum of a cone. The form of flue shown in the latter figures is applicable to any form of dish, and is preferable to the straight flue, as it retards to some extent the escape of heat at the top.

We do not limit ourselves to any particular manner of connecting the edges of the rim where it is cut, as it is obvious that that can be accomplished in a number of ways.

Having thus described our invention, what we claim as new, and desire to secure by Letters Patent, is—

1. In a cake-dish, the combination, with the base or bottom, of a flue removably connected with said base or bottom, and a hand-hold located in the flue, substantially as and for the purpose specified.

2. In a cake-dish, the combination, with the base or bottom, of an expansible rim seated on said base or bottom, a removable flue, and a hand-hold located in the flue, substantially as and for the purpose specified.

3. In a cake-dish, the combination, with the base or bottom having an aperture therein, of a flange formed about said aperture, a flue adapted to engage said flange, and a hand-hold located in the flue, substantially as and for the purpose specified.

4. In a cake-dish, the combination, with the base or bottom having an aperture therein, of a flange formed about said aperture and having one of its faces sloping toward the center, a conical flue adapted to engage said sloping face, and a hand-hold located in the flue, substantially as and for the purpose specified.

THADDEUS H. RESSLER.
ANNIE M. RESSLER.

Witnesses:
JACOB HALBACH,
WM. R. GERHART.